United States Patent
Schnabl

(10) Patent No.: US 7,086,625 B2
(45) Date of Patent: Aug. 8, 2006

(54) BELT RETRACTOR FOR A SEAT BELT

(75) Inventor: Roland Schnabl, Ulm (DE)

(73) Assignee: Takata-Petri (Ulm) GmbH, Ulm (DE)

( * ) Notice: Subject to any disclaimer, the term of this patent is extended or adjusted under 35 U.S.C. 154(b) by 0 days.

(21) Appl. No.: 10/787,890

(22) Filed: Feb. 27, 2004

(65) Prior Publication Data

US 2004/0195420 A1 Oct. 7, 2004

(30) Foreign Application Priority Data

Feb. 28, 2003 (DE) ................................ 103 10 019

(51) Int. Cl.
*B65H 75/48* (2006.01)
(52) U.S. Cl. ..................... 242/384; 242/374; 242/390.8
(58) Field of Classification Search ................ 242/374, 242/384
See application file for complete search history.

(56) References Cited

U.S. PATENT DOCUMENTS

| | | | |
|---|---|---|---|
| 4,261,530 A * | 4/1981 | Asai et al. .................. 242/383 |
| 4,471,918 A * | 9/1984 | Ando ......................... 242/372 |
| 5,529,258 A | 6/1996 | Dybro et al. |
| 5,538,098 A * | 7/1996 | Sparhawk ................... 180/270 |
| 5,634,690 A * | 6/1997 | Watanabe et al. ........... 297/480 |
| 6,755,369 B1 * | 6/2004 | Holbein ...................... 242/384 |
| 6,921,041 B1 * | 7/2005 | Biller ....................... 242/390.8 |
| 2002/0066818 A1 * | 6/2002 | Tanji et al. ................. 242/383 |

FOREIGN PATENT DOCUMENTS

| EP | 1 255 1-5 A2 | 7/2002 |
|---|---|---|
| EP | 1255 105 A2 | 7/2002 |
| FR | 2 796 156 A1 | 1/2001 |
| WO | WO 02/46005 A1 | 6/2002 |

* cited by examiner

*Primary Examiner*—Kathy Matecki
*Assistant Examiner*—Sang Kim
(74) *Attorney, Agent, or Firm*—Foley & Lardner LLP

(57) ABSTRACT

A belt retractor for a seatbelt comprising a retractor pawl which blocks the seatbelt from being pulled out of the belt retractor in the event of an accident, and having a tightening device which tightens the seatbelt in a hazardous situation, the tightening device includes a tightening pawl which, in a blocking position, blocks the belt retractor in the belt uncoiling direction and, in a release position, leaves the belt retractor unaffected. The tightening pawl is assigned a sensor which monitors the position of the tightening pawl and transmits a signal indicating the position of the tightening pawl to a control device of the tightening device.

14 Claims, 2 Drawing Sheets

BELT RETRACTOR FOR A SEAT BELT

BACKGROUND OF THE INVENTION

The invention is relates to a belt retractor for a seat belt with a belt reel and a retractor pawl.

A conventional belt retractor is disclosed in European Laid-open Specification EP 1 225 105 A2 (incorporated by reference herein). The conventional belt retractor has a retractor pawl which blocks the seatbelt from being pulled out of the belt retractor in the event of an accident. The blocking of the retractor pawl can be initiated, for example, by the fact the seatbelt is pulled out of the belt retractor more rapidly than a predetermined limit speed. In addition, the convention belt retractor has a tightening device which tightens the seatbelt in the event of a hazardous situation. To tighten the seatbelt, the belt reel of the belt retractor is rotated in the belt coiling-up direction, as a result of which the seatbelt is retracted by the belt, retractor and is therefore tensioned. This "tightening position" of the seatbelt is fixed by a tightening pawl which, in a blocking position, is in engagement with a toothed ratchet wheel of the belt retractor and therefore blocks the belt retractor in the belt uncoiling direction. If the tightening device is not active, because, for example, a hazardous situation is not present, then the tightening pawl is brought into a release position in which it is not in engagement with the toothed ratchet wheel of the belt retractor and therefore leaves the belt retractor unaffected.

SUMMARY

According to an embodiment of the present invention, a belt retractor for a seatbelt includes a belt reel and a retractor pawl which blocks the uncoiling of the seatbelt from the belt reel in the event of an accident, and a tightening device which tightens the seatbelt in a hazardous situation. The tightening device includes a tightening pawl which, in a blocking position, blocks the belt reel in the belt uncoiling direction and, in a release position, leaves the belt reel unaffected. The tightening pawl is assigned a sensor which monitors the position of the tightening pawl and transmits a signal specifying the position of the tightening pawl to a control device of the tightening device It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
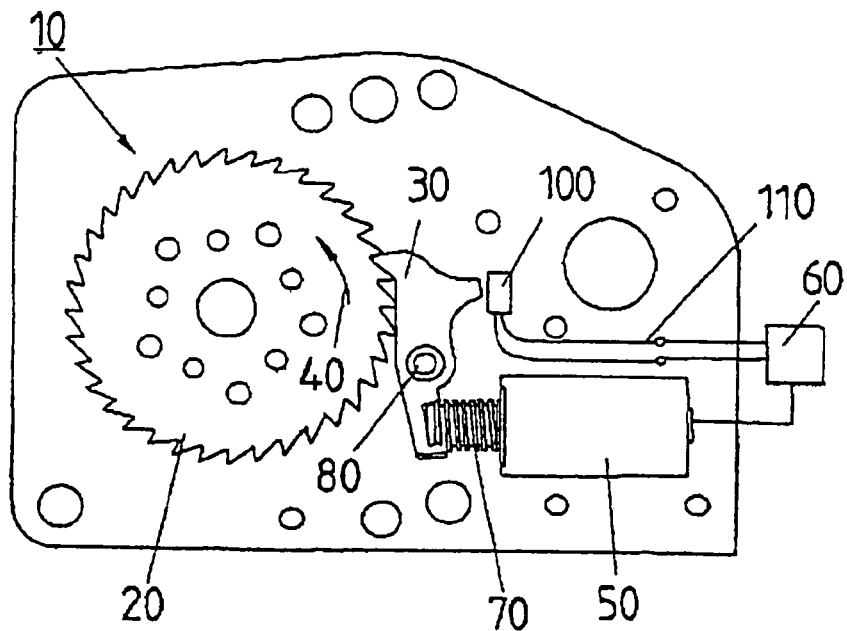
FIG. 1 shows an exemplary embodiment for a belt retractor according to the present invention in which a tightening pawl blocks a toothed ratchet wheel of the belt retractor.
Figure 3:
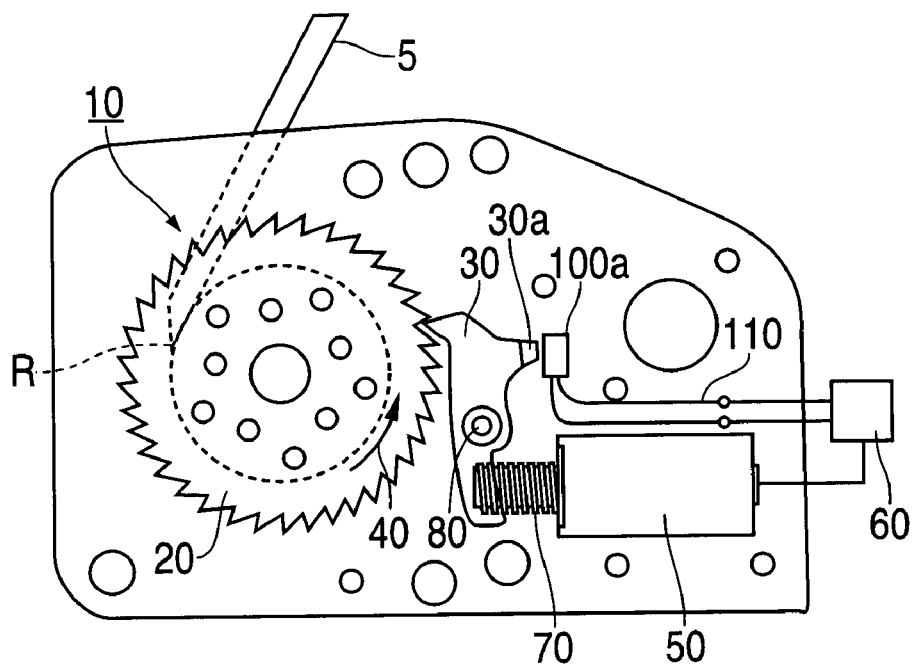
FIG. 3 shows an exemplary embodiment for a belt retractor according to the present invention with a Hall sensor and a tightening pawl with a magnetic region, in which the tightening pawl blocks a toothed ratchet wheel of the belt retractor.
Figure 4:
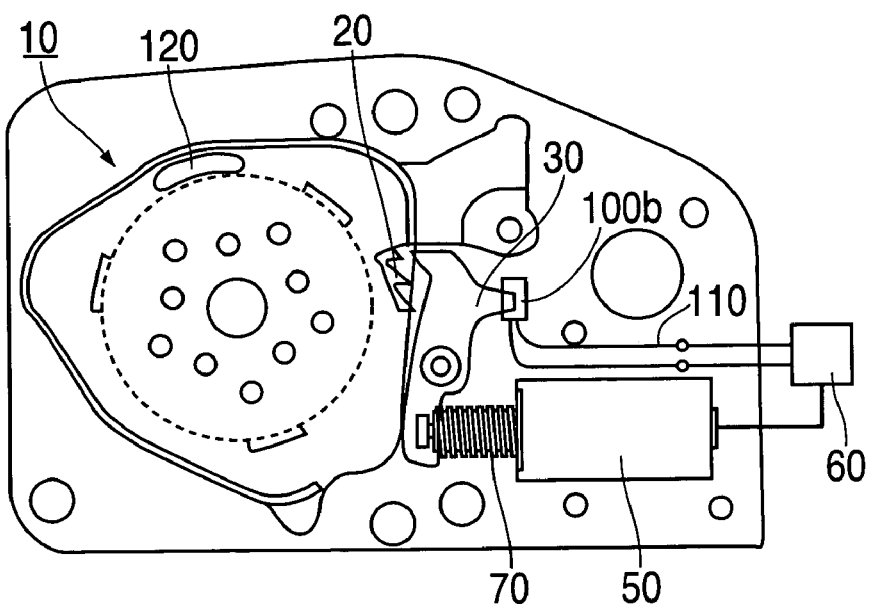
FIG. 4 shows another embodiment of a belt retractor with a retractor pawl and an optical sensor, in which a tightening pawl and toothed ratchet wheel are disengaged.

FIG. 1 shows a belt retractor 10 whose retractor pawl and whose belt reel for retracting the seatbelt are not shown for the sake of clarity. FIG. 1 illustrates a toothed ratchet wheel 20 which is connected in a rotationally fixed manner to the belt reel of the belt retractor 10. FIG. 3 illustrates the belt reel R and seatbelt 5. FIG. 4 illustrates an exemplary retractor pawl 120.

A tightening pawl 30 is connected to the toothed ratchet wheel 20 in such a manner that the toothed ratchet wheel 20 can be rotated exclusively along the belt coiling-up direction 40. The toothed ratchet wheel 20 cannot be moved in the belt uncoiling direction, i.e. counter to the arrow direction of the arrow 40, owing to the blocking position of the tightening pawl It can be seen in FIG. 1 that the teeth of the toothed ratchet wheel 20 and the tightening pawl are designed in such a manner that they form a form-fitting connection on account of an undercut. Owing to this form-fitting connection, the tightening pawl 30 cannot readily be brought from its blocking position, which is illustrated in FIG. 1, into a release position in which it would be disengaged from the toothed ratchet wheel 20.

As can furthermore be seen in FIG. 1, the tightening pawl 30 is mechanically connected to an electromagnet 50 which is activated by a control device 60. In addition, there is a restoring spring 70 between the tightening pawl 30 and the electromagnet 50, the restoring spring likewise acting on the tightening pawl 30.

The electromagnet 50 is connected to the tightening pawl 30 in such a manner that the tightening pawl 30 can be brought by the electromagnet 50 into the blocking position illustrated in FIG. 1; for this purpose, the electromagnet 50 has to be activated, i.e. brought into the "attracted" state. As soon as the tightening pawl 30 has come into engagement with the toothed ratchet wheel 20, the blocking position of the tightening pawl 30 is fixed on account of the form-fitting connection with the toothed ratchet wheel 20. Even after the electromagnet 50 is switched off, the tightening pawl 30 cannot therefore be transferred into a release position before the form-fitting connection is cancelled.

However, as soon as the form-fitting connection is cancelled, the restoring force of the restoring spring 70, which is tensioned by the electromagnet 50, will act on the tightening pawl 30 and will pivot the tightening pawl 30 from the blocking position into a release position, specifically about the pivot axis 80. For this purpose, the restoring spring 70 is fitted between the tightening pawl 30 and the electromagnet 50.

FIG. 1 furthermore illustrates a sensor 100 which is connected to the control device 60 via feed lines 110.

The particular position of the tightening pawl 30 can be determined with the sensor 100; it can therefore be determined whether the tightening pawl 30 is in its blocking position or in its release position.

If the tightening pawl 30 is now to be transferred from its blocking position, which is illustrated in FIG. 1, into a release position, then first of all the toothed ratchet wheel 20 has to be rotated along the belt coiling-up direction 40 until the toothed ratchet wheel 20 and the tightening pawl 30 lose their form-fitting connection and can be disengaged. As soon as this is the case, the spring force of the restoring spring 70 causes the tightening pawl 30 to be pivoted about its pivot axis 80 and therefore to be disengaged from the toothed ratchet wheel 20.

Figure 2:
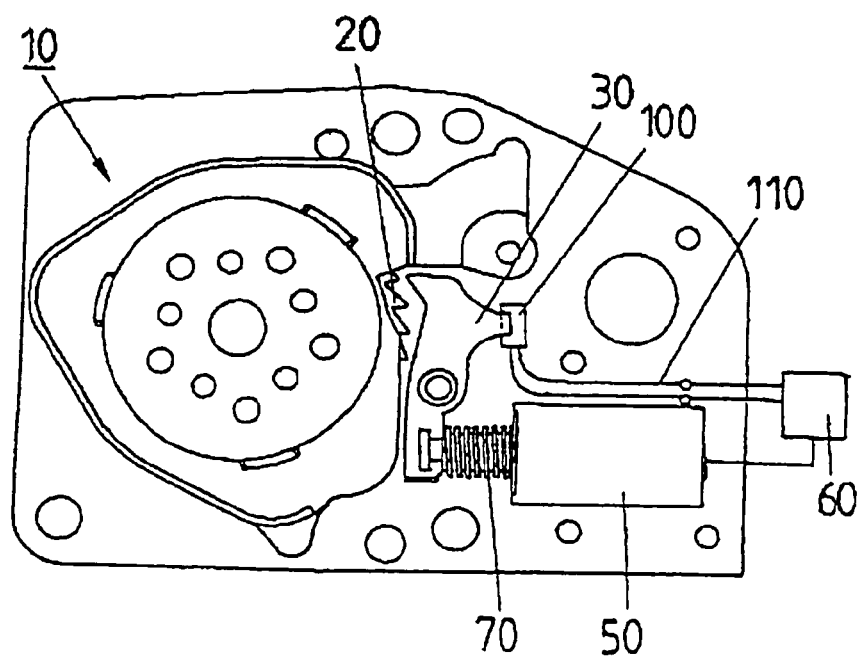
FIG. 2 shows an embodiment according to FIG. 1, with the tightening pawl and toothed ratchet wheel being disengaged.

The position of the tightening pawl 30 after being pivoted about the pivot axis 80 is shown in FIG. 2. It can be seen that the sensor 100 makes it possible to establish the position of the tightening pawl 30.

If the tightening pawl 30 is in its blocking position, then a corresponding "blocking position" signal is transmitted to the control device 60 by the sensor 100; if, in contrast, the tightening pawl 30 is in its release position, then a corresponding "release" signal indicating the release position is transmitted by the sensor 100 to the control device 60.

As a function of the control signal transmitted by the sensor 100, the control unit 60 decides on the manner in which the electromagnet 50 and/or the driving motor of the belt retractor have to be activated. The examples of the operating modes which the control device 60 can make possible will now be summarized in brief.

The operation of the retractor for tightening the seat belt will now be described. According to an embodiment, the control device 60 will first of all activate a drive of the belt retractor via a control line (not illustrated in FIGS. 1 and 2) in such a manner that the belt reel is rotated along the belt coiling-up direction 40, to tighten the seatbelt. This rotation of the belt reel along the belt coiling-up direction 40 causes the seatbelt to be tightened, so that the seat belt bears firmly against the vehicle occupant. At the same time or shortly afterwards, the control device 60 will activate the electromagnet 50 in such a manner that the tightening pawl 30 comes into engagement with the toothed ratchet wheel 20. In this case, the tightening pawl 30 always comes into engagement with the toothed ratchet wheel 20 upstream of the retractor pawl, with the result that the tightening pawl 30 is load-bearing. Should the tensile force acting on the seatbelt in the belt pull-out direction exceed a predetermined maximum value, the rotationally fixed connection between the belt reel and the toothed ratchet wheel 20 would be broken open or cancelled—for example by a torque transmission pin shearing off—and the belt reel could rotate again. Thereupon the preset retractor pawl in the belt retractor housing or frame would then become load-bearing.

If, however, the tightening pawl 30 is still load-bearing—i.e. before the rotationally fixed connection between the belt reel and the toothed ratchet wheel 20 "breaks open" in the event of an "overload"—and engages in the toothed ratchet wheel 20, its "blocking position" is fixed owing to the form-fitting connection with the toothed ratchet wheel 20, 50 that in spite of the restoring force of the "tensioned" restoring spring 70, the tightening pawl 30 cannot pivot back into the release position illustrated in FIG. 2.

Owing to the blocking position of the tightening pawl 30, neither the toothed ratchet wheel 20 nor the belt reel of the belt retractor 10, which reel is connected in a rotationally fixed manner to the toothed ratchet wheel 20, can rotate in the belt uncoiling direction—i.e. counter to the arrow direction 40 according to FIG. 1, with the result that the seatbelt bears firmly against the vehicle occupant and is fixed in this position.

The release of the retractor's locking mechanism will now be described. According to an embodiment, if the control device 60 ascertains by means of sensors (not illustrated in FIGS. 1 and 2) that there is no longer a hazardous situation and the seatbelt may be released, the tightening pawl 30 is to be pivoted from its blocking position illustrated in FIG. 1 into the release position illustrated in FIG. 2. Since a pivoting movement of this type is not readily possible on account of the form-fitting connection between the tightening pawl 30 and the toothed ratchet wheel 20, the control device 60 has to activate the driving motor of the belt retractor 10 in such a manner that the belt reel and the toothed ratchet wheel 20 are rotated—if only slightly—along the belt coiling-up direction 40, so that the toothed ratchet wheel 20 and the tightening pawl 30 can be disengaged. As soon as the tightening pawl 30 is no longer held by the toothed ratchet wheel 20, the restoring force of the restoring spring 70 will cause the tightening pawl 30 to pivot away about the pivot axis 80 and pass into the release position illustrated in FIG. 2. This "springing back" of the tightening pawl 30 into the release position according to FIG. 2 is ascertained by the sensor 100 which passes on a corresponding "release position" signal to the control device 60. The control device 60 thereupon knows that further activation of the driving motor of the belt retractor 10 is no longer required and the belt reel and the toothed ratchet wheel 20 no longer have to be rotated along the belt coiling-up direction 40. A corresponding activation of the driving motor is therefore immediately switched off. Owing to the driving motor being immediately switched off, it is ensured that, in order to deactivate the tightening pawl 30, the toothed ratchet wheel 20 and the belt reel have to be rotated in the belt coiling-up direction 40 merely to the extent absolutely necessary.

The position of the tightening pawl 30 during a hazardous situation may be monitored as described below. According to an embodiment, the control device 60 may monitor whether the tightening pawl 30 is in the correct position, i.e. in the blocking position, during the continuation of a hazardous situation. In specific terms, the sensor 100 is continuously monitored by the control device 60, and it is continuously determined which position the tightening pawl 30 is in. If it is ascertained during this monitoring of the sensor 100 that the tightening pawl 30 has been released and transferred into its release position owning to the restoring force of the restoring spring 70, then, by renewed activation of the electromagnet 60, the control device 60 can bring the tightening pawl 30 into the blocking position again. Owing to the combination of the control device 60 with the sensor 100, it is therefore possible, even during the continuation of a hazardous situation, to ensure that the blocking pawl 30 is always in the required blocking position.

The seatbelt may be retightened. For example, if the vehicle occupant is not in the correct sitting position during a first tightening process, then despite the tightening which has taken place by means of the tightening device, the seatbelt may not lie correctly or the vehicle occupant may not have been pulled completely back into the seat. In an embodiment, if, after a first tightening, the seatbelt still has slack, then the restoring spring which is present in the belt retractor 10 will rotate the belt reel and therefore the toothed ratchet wheel 20 along the belt coiling-up direction 40. Owing to this rotation, the previous form-fitting connection between the toothed ratchet wheel 20 and the tightening pawl 30 will be released, whereupon the restoring spring 70 will transfer the tightening pawl 30 into the released position. The sensor 100 will ascertain this behavior of the tightening pawl 30 and transmit a corresponding signal to the control device 60. The control device 60 thereupon recognizes that the seatbelt is no longer tightened and will thereupon activate the driving motor of the belt retractor 10 in such a manner that the belt reel is rotated along the belt coiling-up direction 40 and the seatbelt is coiled up. After the associated, renewed tightening of the seatbelt, the control device 60 will activate the electromagnet 50 a further time in such a manner that the tightening pawl 30 is transferred into the blocking position and passes into a form-fitting engagement with the toothed ratchet wheel 20. In summary, it is therefore possible with the control device 60 and the sensor 100 to also recognize an insufficient first tightening and to correct it in a second tightening step following thereupon.

The sensor, which is illustrated in FIGS. 1 and 2, may be, for example, a Hall sensor 100a which interacts with the tightening pawl 30; for this purpose, at least part of the tightening pawl 30 has a magnetic region 30a which can be recognized by the Hall sensor 100a.

Instead of a Hall sensor the sensor may also be an optical sensor 100b which forms a light barrier, for example, in order to determine the position of the tightening pawl 30.

Moreover, as has been explained in conjunction with FIGS. 1 and 2, the sensor 100 and the control device 60 may also be used in other designs of belt retractor. For example, reference may be made in this connection in particular to a belt retractor which is shown in FIGS. 1 to 11 of European Laid-open Specification EP 1 225 105 A2 and is described in detail in the passage from column 8, line 55 to column 15, line 40 (hereby incorporated by reference herein in its entirety). Reference may be made to the explanations given there in respect of the manner of functioning of this belt retractor.

In addition, the sensor 100 and the control device 60 may also be used, for example, in the case of a belt retractor as is described in detail in conjunction with FIG. 12 and the passage from column 15, line 41 to column 16, line 18 of the abovementioned European laid-open specification.

Of course, the tightening device described with reference to the exemplary embodiment and having the sensor 100 and the control device 60 may also be used in all other known types of belt retractor.

Accordingly, provision is made according to an embodiment of the invention for the tightening pawl to be assigned a sensor which monitors the position of the tightening pawl and transmits a signal specifying the position of the tightening pawl to the tightening device.

An advantage of an embodiment of the belt retractor can be seen in the fact that the activation of the tightening pawl by the tightening device is significantly improved and simplified owing to the presence of the sensor. It is thus namely possible to use the sensor to determine the particular position of the tightening pawl and therefore to ascertain whether the tightening pawl is in the desired position, for example, in the blocking position. If this is not the case, appropriate activation of the tightening pawl enables the error to be eliminated and the tightening pawl to be brought into the desired position.

Another advantage of an embodiment of the belt retractor can be seen in the fact that with it greater comfort is achieved for the vehicle occupant than would be the case without a sensor. In order to unlock the tightening pawl, it is namely necessary for the belt retractor to be rotated—at least slightly—in the belt coiling-up direction in order to disengage the tightening pawl and a toothed ratchet wheel (or the like) of the belt retractor, which wheel is in engagement with the tightening pawl. With the sensor provided according to the invention, the position in which the tightening pawl is in can now be monitored, so that, during the unlocking of the tightening pawl, the belt reel of the belt retractor has to be rotated in the belt coiling-up direction only to the extent absolutely necessary in order to make it possible for the tightening pawl to change over from the blocking position into the release position. The sensor according to an embodiment of the invention is highly advantageous here, in particular, if the tightening pawl and the toothed ratchet wheel form a form-fitting connection—for example by means of an undercut—and therefore cannot readily be separated from each other; this is because, in this case, the sensor can be used to monitor the time from which the tightening pawl and the toothed ratchet wheel are no longer in engagement and are separated.

Another advantage of an embodiment of the belt retractor can be seen in the fact that it is also able to be used to recognize when the vehicle occupant has not been pulled back completely into the seat during a first tightening process of the tightening device and the seatbelt therefore still has play or is still loose. In such a case, the restoring spring which is always present in the belt retractor will namely pull the seatbelt back, as a result of which the blocking pawl is, if appropriate, transferred "unintentionally" from its blocking position into the release position. This—unintentional—switching over of the tightening pawl into the release position can be detected by the sensor provided according to the invention, so that the desired tightening of the seatbelt can be brought about in a subsequent "second" tightening process. In other words, the effect which can be achieved in an embodiment of the belt retractor owning to the presence of the sensor is that the seatbelt is also tightened repeatedly until the belt is tightened as desired.

The belt reel can be locked in a particularly simple and therefore advantageous manner with the aid of the tightening pawl when the belt retractor has a toothed ratchet wheel which is connected in a rotationally fixed manner to the belt reel and interacts with the tightening pawl.

In order to achieve the effect that the tightening pawl remains in its blocking position even if the drive acting on the tightening pawl in order to change over the position of the latter is switched off, it is regarded as advantageous if, in its blocking position, the tightening pawl forms a form-fitting connection with at least one tooth of the toothed ratchet wheel.

The form-fitting connection can be formed, for example, by an undercut.

It is regarded as advantageous if the tightening pawl is connected to a restoring device which automatically separates the tightening pawl from the toothed ratchet wheel as soon as there is no longer a form-fitting connection between the tightening pawl and the toothed ratchet wheel. The effect achieved in this advantageous refinement of the belt retractor is that the tightening pawl is automatically separated from the toothed ratchet wheel as soon as the belt reel of the belt retractor and therefore the toothed ratchet wheel are rotated in the belt coiling-up direction.

The restoring device can be formed in a particularly simple and advantageous manner by a restoring spring, for example.

Moreover, it is regarded as advantageous if the tightening device is designed in such a manner that it rotates the belt reel of the belt retractor in the coiling-up direction to release the blocking position of the tightening pawl. As has already been explained, this is because, when the belt reel is rotated in the coiling-up direction, the tightening pawl and the toothed ratchet wheel are disengaged, whereupon the restoring device can automatically transfer the tightening pawl from the blocking position into the release position.

In order to increase the comfort for a vehicle occupant protected by the seat belt, it is regarded as advantageous if as small a tightening force as possible is exerted on the seatbelt in order to unlock the tightening device. In order to achieve this, provision is made, according to a development of the belt retractor, for the tightening device to rotate the belt reel exclusively in the belt coiling-up direction until the sensor produces a signal which indicates the release position of the tightening pawl. In this refinement of the invention, the restoring device and the sensor operate "hand in hand" with each other, and so, namely during a rotation of the belt reel in the belt coiling-up direction, the toothed ratchet wheel and the tightening pawl are disengaged, whereupon the restoring device automatically transfers the tightening pawl from the blocking position into the release position; this transfer from the blocking position into the release position is in turn detected by the sensor which passes on a corresponding signal to the tightening device which then commences the further tensioning of the seat belt for the purpose of unlocking the tightening pawl.

Moreover, it is regarded as advantageous if the tightening device is designed in such a manner that it continuously monitors the position of the tightening pawl with the sensor during the presence of a hazardous situation. With continuous monitoring of the position of the tightening pawl, it can namely be ensured that the said tightening pawl cannot pass unnoticed from the blocking position into the release position and release the seat belt.

In respect of monitoring the tightening pawl, it is regarded as advantageous if the tightening device is designed in such a manner that it repeats, appropriate, the tightening process of the seatbelt if the sensor signals the release position of the tightening pawl although the hazardous situation has not yet ended.

A particularly simple and cost-effective sensor is, for example, a Hall sensor, with the result that it is regarded as advantageous if the tightening pawl is at least partially magnetic and the sensor is formed by a Hall sensor.

As an alternative, other types of sensor are also conceivable; thus, the sensor may be, for example, an optical sensor which, for example forms an optical light barrier for "measuring" or determining the position of the tightening pawl.

Moreover, the sensor can also be formed by an electrical switching contact, the switching state of which indicates whether the tightening pawl is situated in the blocking position or in the release position.

The priority application, DE 103 10 019.9, filed Feb. 28, 2003, is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A belt retractor for a seat belt comprising:
   a belt reel;
   a retractor pawl which blocks the uncoiling of the seatbelt from the belt reel in the event of an accident; and
   a tightening device which tightens the seatbelt in a hazardous situation;
   wherein the tightening device includes a tightening pawl which, in a blocking position, blocks the belt reel in a belt uncoiling direction and, in a release position, leaves the belt reel unaffected;
   wherein the tightening pawl is assigned a sensor which monitors the position of the tightening pawl and transmits a signal specifying the position of the tightening pawl to a control device, and
   wherein the control device is configured so that when a signal is received from the sensor indicating that the tightening pawl has moved into the release position, the control device stops rotation of the belt reel in a tightening direction.

2. The belt retractor according to claim 1, wherein the belt retractor includes a toothed ratchet wheel which is connected in a rotationally fixed manner to the belt reel and interacts with the tightening pawl.

3. The belt retractor according to claim 2, wherein the tightening pawl, in the blocking position, forms a form-fitting connection with a tooth of the toothed ratchet wheel.

4. The belt retractor according to claim 3, wherein the form-fitting connection is formed by an undercut.

5. The belt retractor according to claim 2, wherein the tightening pawl is connected to a restoring device which automatically separates the tightening pawl from the toothed ratchet wheel as soon as there is no longer a form-fitting connection between the tightening pawl and the toothed ratchet wheel.

6. The belt retractor according to claim 5, wherein the restoring device is formed by a restoring spring.

7. The belt retractor according to claim 1, wherein the tightening device is configured to rotate the belt reel in the belt coiling-up direction to release the blocking position of the tightening pawl.

8. The belt retractor according to claim 1, wherein the tightening device rotates the belt reel exclusively in the belt coiling-up direction until the sensor produces a signal which indicates the release position of the tightening pawl.

9. The belt retractor according to claim 1, wherein the tightening device is configured to continuously monitor the position of the tightening pawl with the sensor during the presence of a hazardous situation.

10. The belt retractor according to claim 9, wherein the tightening device is configured to repeat the tightening process of the seatbelt if the sensor indicates that the tightening pawl is in the release position when a hazardous situation has not ended.

11. The belt retractor according to claim 1, wherein the sensor is a Hall sensor and the tightening pawl is at least partially magnetic.

12. The belt retractor according to claim 1, wherein the sensor is an optical sensor.

13. The belt retractor according to claim 12, wherein the optical sensor forms a light barrier.

14. The belt retractor according to claim 1, wherein the sensor is formed by an electrical switching contact.

* * * * *